(12) United States Patent
Wu et al.

(10) Patent No.: US 11,886,734 B2
(45) Date of Patent: Jan. 30, 2024

(54) SECURE MEMORY CARD AND CONTROL METHOD THEREOF

(71) Applicant: InfoKeyVault Technology Co., Ltd., Taipei (TW)

(72) Inventors: Ming-Ting Wu, Taipei (TW); Neng-Jie Yu, Taipei (TW); Chihhung Lin, Taipei (TW)

(73) Assignee: INFOKEYVAULT TECHNOLOGY CO., LTD., Taipei (TW)

( * ) Notice: Subject to any disclaimer, the term of this patent is extended or adjusted under 35 U.S.C. 154(b) by 105 days.

(21) Appl. No.: 17/513,110

(22) Filed: Oct. 28, 2021

(65) Prior Publication Data
US 2022/0137867 A1  May 5, 2022

(30) Foreign Application Priority Data

Oct. 30, 2020 (TW) .................................. 109137770
Oct. 28, 2021 (TW) .................................. 110139996

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0604; G06F 3/0655; G06F 3/0679; G06F 21/74; G06F 21/77
See application file for complete search history.

(56) References Cited

U.S. PATENT DOCUMENTS

2009/0241103 A1* 9/2009 Pennisi ..................... G06F 8/65
                                                      713/323
2011/0022746 A1   1/2011 Chang
                         (Continued)

FOREIGN PATENT DOCUMENTS

| CN | 105243344 | 1/2016 |
| TW | 201009583 | 3/2010 |
| TW | 202028991 | 8/2020 |

OTHER PUBLICATIONS

"European Search Report" dated Mar. 21, 2022, European Patent Office.

*Primary Examiner* — Jane W Benner
(74) *Attorney, Agent, or Firm* — WPAT, P.C

(57) ABSTRACT

A secure memory card includes a non-volatile memory device for storing data, which includes a specific address and a regular address different from the first specific address; a secure element for conducting a securing operation; and a non-volatile memory controller in communication with the non-volatile memory device and the secure element, adapted to receive a command from a host. The non-volatile memory controller interacts with the secure element to conduct the securing operation in response to the command from the host if the command from the host is secure-element control command. The secure-element control command is a single command taking a single instruction cycle and corresponds to the specific address. The non-volatile memory controller interacts with the non-volatile memory device while having no interaction with the secure element in response to the command from the host if the command from the host is a non-secure-element control command corresponding to the regular address.

8 Claims, 12 Drawing Sheets

(56) References Cited

U.S. PATENT DOCUMENTS

| | | |
|---|---|---|
| 2011/0252244 A1 | 10/2011 | Lesea et al. |
| 2011/0271044 A1 | 11/2011 | Narendra et al. |
| 2018/0267898 A1* | 9/2018 | Henry ................ G06F 12/0868 |
| 2019/0095651 A1* | 3/2019 | Yokoi ................ G06F 3/0647 |
| 2021/0216476 A1* | 7/2021 | Sawan ................ H04L 9/0897 |

* cited by examiner

SECURE MEMORY CARD AND CONTROL METHOD THEREOF

FIELD OF THE INVENTION

The present invention relates to a secure memory card, and more particularly to a secure memory card built therein a secure element. The present invention further relates to a chip control method, and more particularly to a method for controlling a secure element of a secure memory card.

BACKGROUND OF THE INVENTION

With the popularization of information technologies, it is common to exchange data between information devices or conduct financial transactions through various data transmission channels such as USB interfaces or the Internet. Therefore, important information such as a variety of accounts and passwords that are supposed to be kept confidential are often stored together with general information in user's information devices, e.g. common personal computers, notebook computers, or even more popular smart phones. Under this circumstance, it is important and critical to avoid secure information from being illegally accessed and used. Currently, there are few information devices equipped with data-securing modules for safe storage of data, and unfortunately, for most existing information devices, the data-securing modules, if any, cannot be provided by way of simple installation.

In order to have an existing information device additionally exhibit data-securing functions without installation of a complicated data-securing module, a secure memory card as illustrated in FIG. 1 is developed for use with the information device. As shown, the secure memory card 11 is a common secure digital memory card, e.g., microSD flash memory card, provided with an additional secure element 119, thereby achieving the evaluation assurance level CC EAL5+ of a Common Criteria security evaluation. The secure element 119 functions for storing and managing sensitive data such as passwords and keys, and running secure applications such as payment. For example, when an application program 100 of a host 10 issues an encryption command to a file system 101 for performing data encryption, the file system 101 issues a preset special combination 102 to an SD controller 110 in response to the encryption command. The preset special combination 102 consists of multiple continuous read/write commands, e.g., read commands twice and write command once in sequence. Triggered by the preset special combination, a vendor command (VC) tunnel is established between the SD controller 110 and the file system 101. Once the write command involving data encryption enters the VC tunnel 103, the SD controller 110 would recognize the write command as a vendor command. As understood by those skilled in the art, the vendor command may be specifically defined to perform an encrypting operation. For example, under the specific definition of the vendor command, the SD controller 110 transmits secure data related to the write command to the secure element 119 to be encrypted, and the encrypted data is then transmitted back to the application program via the VC tunnel 103 or stored into a flash memory 111. In this way, data encryption can be achieved without any conventional data-securing module.

It is understood from the above-described prior art that a preset special combination of a series of read and write commands are required to define a vendor command, and a VC tunnel is required for subsequent encrypting commands. Such a preset special combination, however, is complicated and inefficiently consumes instruction cycles. Furthermore, according to the prior art, the SD controller 110 and the secure element 119 follow an ISO-7816 communication protocol of smart cards to communicate with each other. The ISO-7816 standard, however, can operate up to only 1.25 MHz, and the three-pin (IO/CLK/RST) configuration is only suitable for half-duplex signal transmission. Such data-processing efficiency is unsatisfactory for current applications.

SUMMARY OF THE INVENTION

Therefore, the present invention provides a secure memory card containing an improved secure element.

The present invention further provides a method for controlling a secure element of a secure memory card, which exhibits improved data-processing efficiency.

An aspect of the present invention relates to a secure memory card. The secure memory card includes a non-volatile memory device, a secure element, and a non-volatile memory controller in communication with the non-volatile memory device and the secure element. The non-volatile memory device includes a reserved range of addresses in connection with secure-element control and a regular range of addresses in connection with regular data access. The reserved range of addresses and the regular range of addresses do not overlap with each other. When the host issues a secure-element control command, which is a single command taking a single instruction cycle and corresponds to a specific address belonging to the reserved range of addresses, to the non-volatile memory controller, the non-volatile memory controller interacts with the secure element to conduct a securing operation in response to the secure-element control command. In contrast, when the host issues a non-secure-element control command, which corresponds to a regular address belonging to the regular range of addresses, to the non-volatile memory controller, the non-volatile memory controller interacts with the non-volatile memory device but do not interact with the secure element in response to the non-secure-element control command.

Another aspect of the present invention relates to a control method of a secure memory card. The secure memory card is adapted to be used with a host, which includes a file system. The secure memory card includes a non-volatile memory device, a secure element and a non-volatile memory controller. According to the control method, when the host issues a secure-element control command, which is a single command taking a single instruction cycle and corresponds to a specific address belonging to a reserved range of addresses, to the non-volatile memory controller, the non-volatile memory controller interacts with the secure element to conduct a securing operation in response to the secure-element control command. In contrast, when the host issues a non-secure-element control command, which corresponds to a regular address belonging to a regular range of addresses, to the non-volatile memory controller, the non-volatile memory controller interacts with the non-volatile memory device but do not interact with the secure element in response to the non-secure-element control command.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
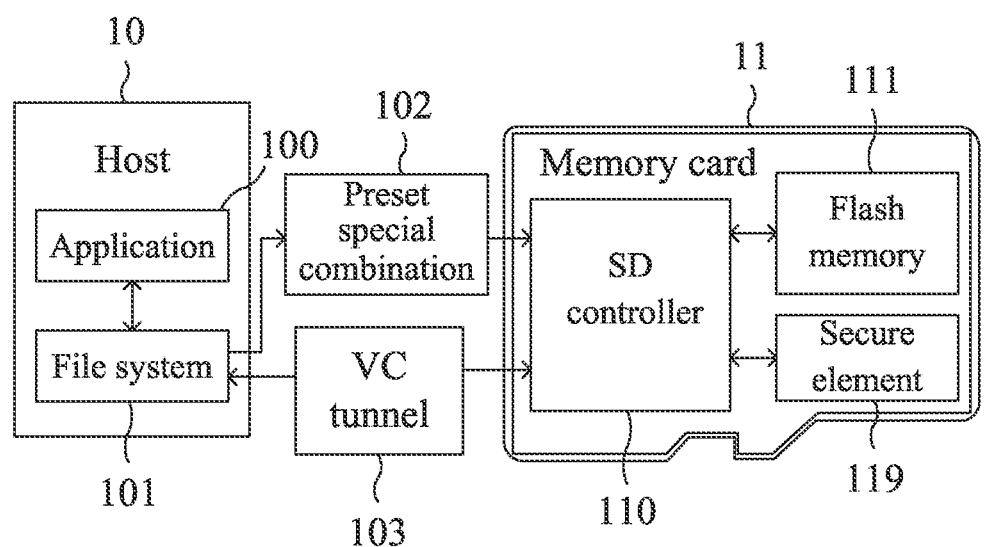
FIG. 1 is a functional block diagram schematically illustrating a secure memory card according to prior art.
Figure 2:
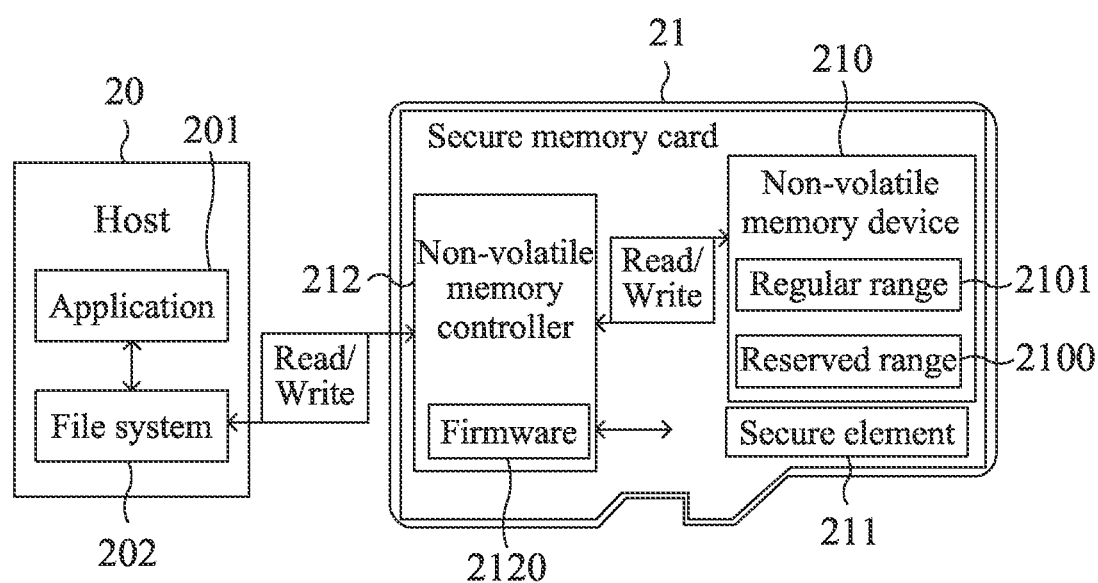
FIG. 2 is a functional block diagram schematically illustrating a secure memory card according to the present invention.

Please refer to FIG. 2. A secure memory card according to an embodiment of the present invention is schematically shown. The secure memory card 21 may be, for example, a secure digital memory card, and is in communication with a host 20 via wired signal transmission means such as metal pins, or via wireless signal transmission means such as Bluetooth or wireless network. The secure memory card 21 includes a non-volatile memory device 210, a secure element 211 and a non-volatile memory controller 212. The non-volatile memory device 210 may be, for example, a flash memory, and functions for storing data. The secure element 211 is implemented with a CC EAL5+ verified chip, for example produced by Infineon Technologies, and functions for storing and managing sensitive data and running secure applications. The non-volatile memory controller 212 is in communication with the host 20, the non-volatile memory device 210 and the secure element 211, and interacts with the secure element 211 by way of a secure-element control command, which is a single command taking a single instruction cycle. In this embodiment, the non-volatile memory controller 212 is installed with a firmware 2120, which triggers the secure element 211 to perform an encrypting operation in response to the secure-element control command.

In more detail, when an application program 201 of the host 20 actuates a securing operation in corporation with the secure element 211, the application program 201 has a file system 202 issue a write command corresponding to a specific address to the non-volatile memory controller 21. The write command consists of a single command taking a single instruction cycle and serves as the secure-element control command. The specific address as described above may be configured to be a preset multi-bit digit, and belong to a reserved range 2100 of addresses of the non-volatile memory device 210. It is to be noted that the term "reserved range of addresses" is given to be distinguished from a regular range 2101 of addresses, where ordinary data other than sensitive data are stored. The reserved range of addresses and the regular range of addresses are non-overlapping so that whether the write command is a secure-element control command or not can be readily determined according to the address in connection with the write command. It is also to be noted that the blocks 2101 and 2100 as shown in FIG. 2 are only used for showing the non-overlapping state of the regular range and the reserved range, and there is no intention to indicate or suggest relative sizes and locations of the ranges of addresses. The firmware 2120 of the non-volatile memory controller 212 exhibits an address-decoding function and is able to differentiate the addresses. Once the specific address is recognized, the secure element 211 can be triggered by the firmware 2120 to conduct the securing operation, which will be exemplified as follows.

Figure 3A:
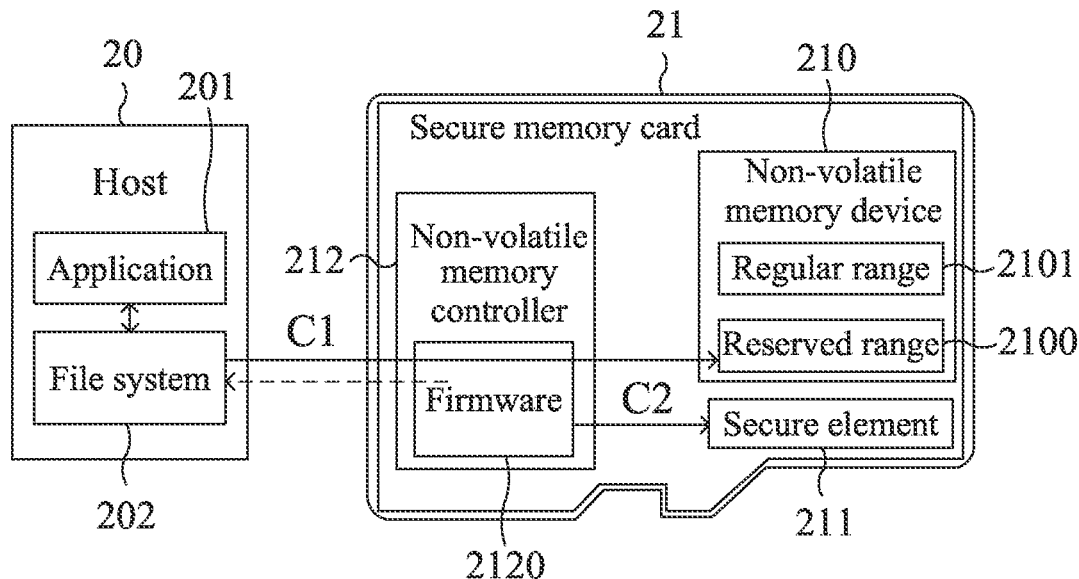
FIG. 3A is a functional block diagram schematically illustrating a secure memory card according to a first embodiment of the present invention.

A secure memory card according to a first embodiment of the present invention is illustrated in FIG. 3A. As described above, the file system 202 issues a write command C1 corresponding to a specific address, e.g., a first address, to the non-volatile memory controller 21 for triggering the encrypting operation, wherein the write command is a single command taking a single instruction cycle while having no data to be written into the non-volatile memory device 210. It can be recognized that the write command is a secure-element control command as the first address belongs to the reserved range 2100 of addresses of the non-volatile memory device 210. The firmware 2120 included in the non-volatile memory controller 212, when recognizing the first address, issues a command C2 to have the secure element 211 enter a designated encryption mode. It is to be noted that the secure element 211 may have various encryption modes that are activated by different kinds of secure-element control commands. For example, the write command corresponding to the first address is used as a first kind of secure-element control command and activates a first encryption mode of the secure element 211, e.g., AES-256-CBC, and another write command corresponding to a second specific address, which also belongs to the reserved range 2100 of addresses, is used as a second kind of secure-element control command and activates a second encryption mode of the secure element 211, e.g., AES-256-CTR. In contrast, if a further write command corresponds to a third specified address that belongs to the regular range 2101 of addresses of the non-volatile memory device 210 other than the reserved range 2100, the write command would be a non-secure-element control command. In other words, data would be written into the third specified address in the regular range 2101 in response to the write command, and the secure element 211 would have no response to the non-secure-element control command.

Figure 3B:
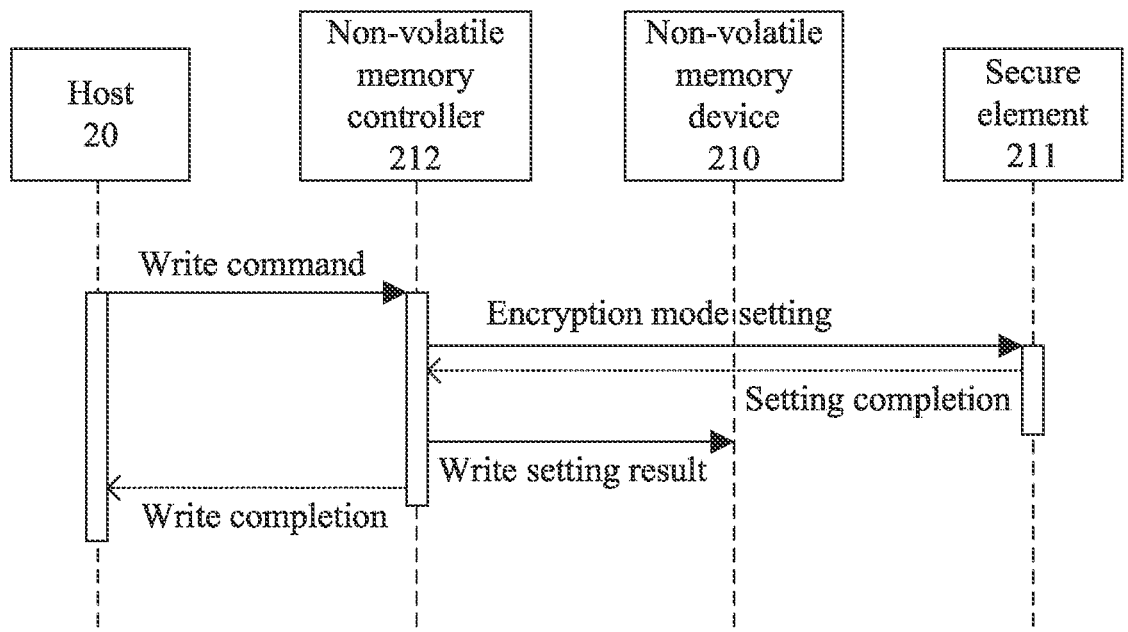
FIG. 3B is a schematic timing diagram of an exemplified securing operation conducted on the secure memory card shown in FIG. 3A.

FIG. 3B schematically illustrates a timing diagram of an encrypting operation performed with the secure memory card shown in FIG. 3A. In particular, the timing diagram is used for illustrating details and time sequence of transmission and execution of commands. First of all, the host 20 issues a write command to the non-volatile memory controller 212. If the write command is determined to be a secure-element control command by the non-volatile memory controller 212, the non-volatile memory controller 212 performs setting of an encryption mode of the secure element 211 in response to the write command. The secure element 211 set with a specified encryption mode issues a signal indicative of setting completion to the non-volatile memory controller 212 (see the dash line). The non-volatile memory controller 212, in response to the signal indicative of setting completion, further performs an operation of writing a result of the setting of encryption mode, e.g. a code indicative of successful setting, into the non-volatile memory device 210. Meanwhile, the non-volatile memory controller 212 sends back to the host 20 a signal indicative of write completion.

Figure 3C:
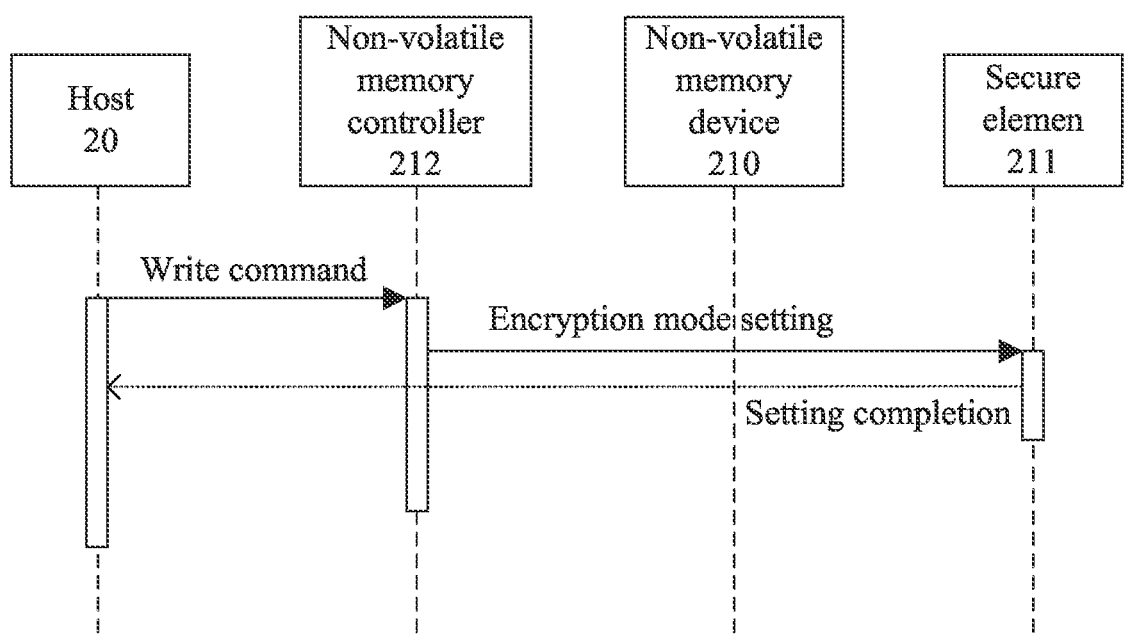
FIG. 3C is a schematic timing diagram of another example of securing operation conducted on the secure memory card shown in FIG. 3A.

In this embodiment, the operation of writing a result of the setting of encryption mode into the non-volatile memory device 210 may be omitted, as illustrated in FIG. 3C. Meanwhile, the signal indicative of setting completion issued from the secure element 211 is transmitted all the way to the host 20 instead of the non-volatile memory controller 212. Therefore, the operational frequency of non-volatile memory device 210 can be reduced so as to extend its life span.

Figure 4A:
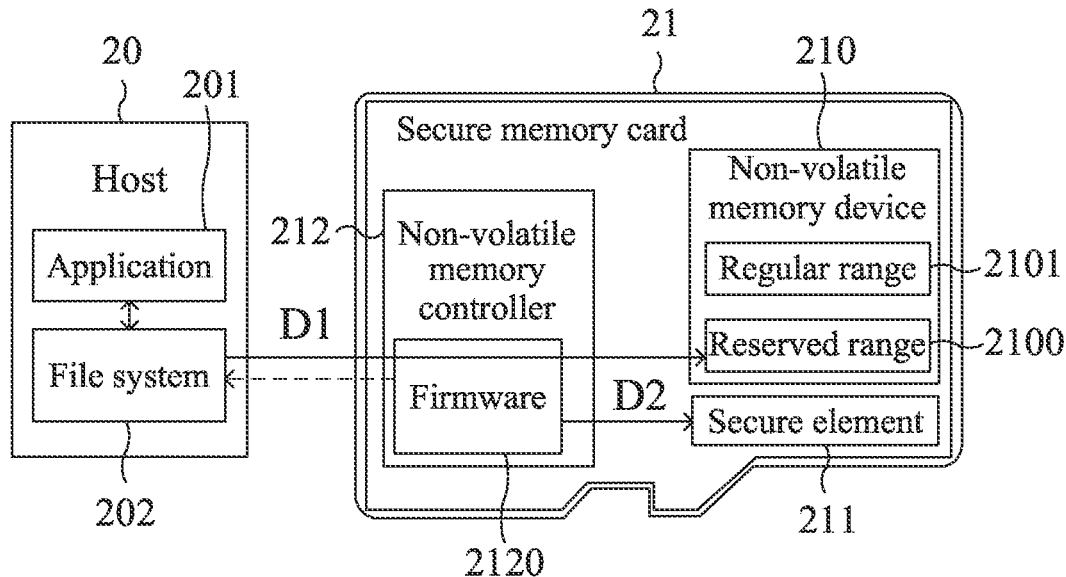
FIG. 4A is a functional block diagram schematically illustrating a secure memory card according to a second embodiment of the present invention.

FIG. 4A schematically illustrates a secure memory card according to a second embodiment of the present invention. In this embodiment, the file system 202 issues a write command D1 corresponding to a specific address, e.g., a third address, to the non-volatile memory controller 212, wherein the write command is a single command taking a single instruction cycle and contains a specific data to be written, and the third address belongs to the reserved range 2100 of the non-volatile memory device 210. The write command D1 is thus determined to be a secure-element control command for triggering the securing operation of the secure element 211. The firmware 2120 included in the non-volatile memory controller 212, when recognizing the secure-element control command, issues a command D2 to revise a set of parameters of the secure element 211, e.g., an initialization vector (IV) value, according to the specific data. In response to the command D2, the secure element 211 sets the IV value used in the AES-256-CBC encryption. According to this embodiment of the present invention, the set of parameters can be securely revised by way of this kind of write command.

Figure 4B:
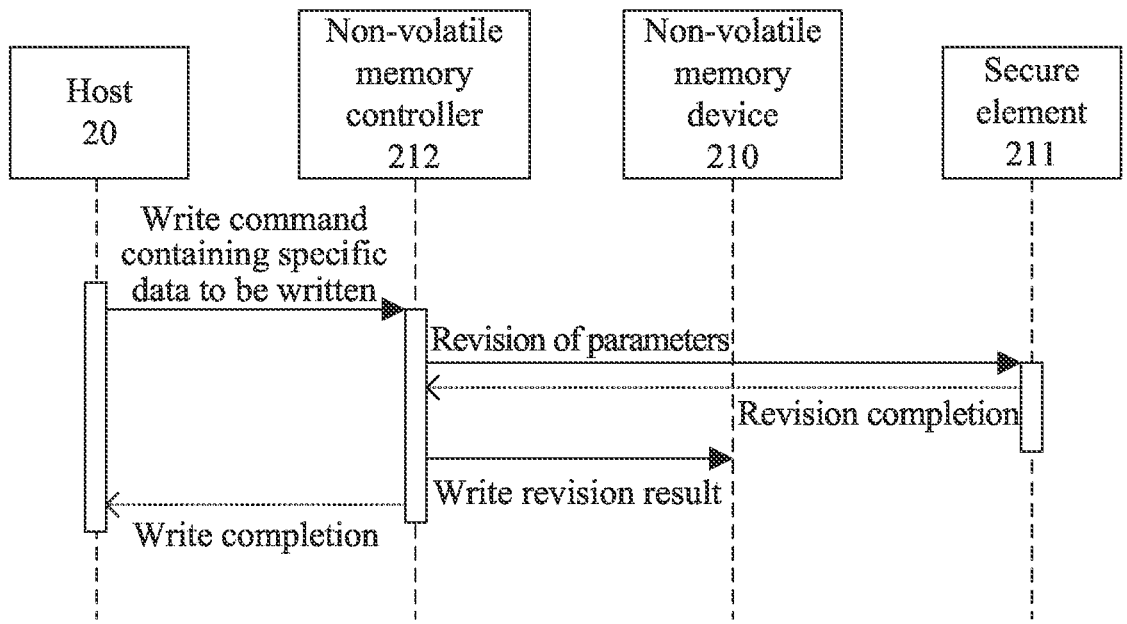
FIG. 4B is a schematic timing diagram of an exemplified securing operation conducted on the secure memory card shown in FIG. 4A.
Figure 4C:
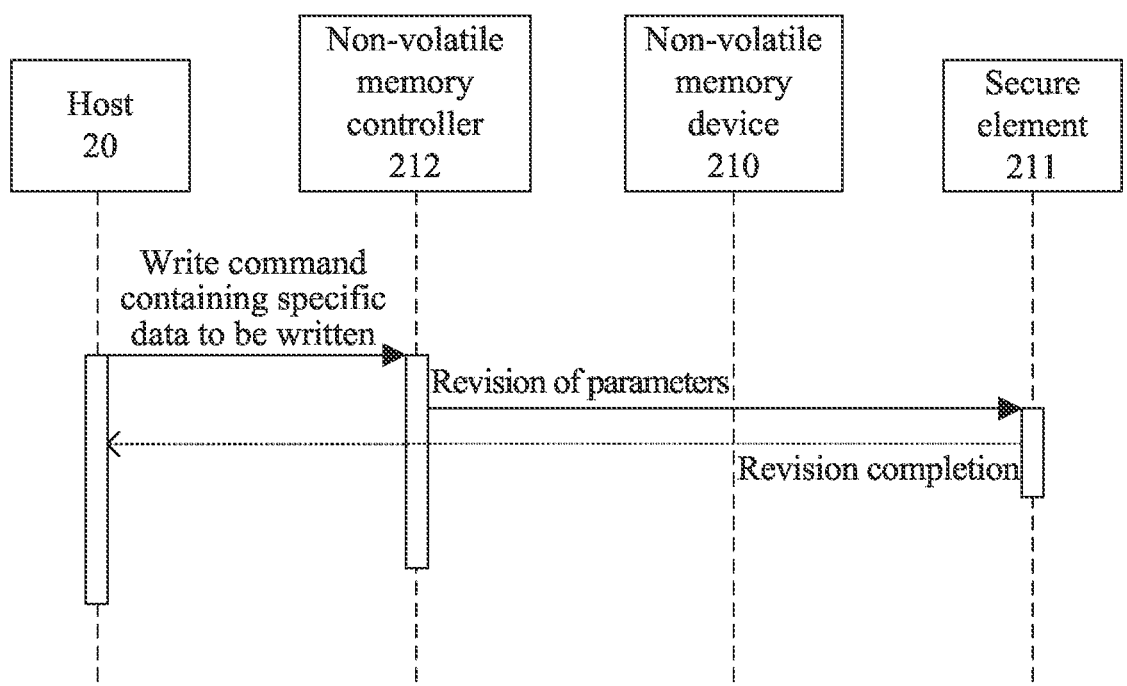
FIG. 4C is a schematic timing diagram of another example of securing operation conducted on the secure memory card shown in FIG. 4A.

FIG. 4B schematically illustrates a timing diagram of a secured revision operation performed with the secure memory card shown in FIG. 4A. In particular, the timing diagram is used for illustrating details and time sequence of transmission and execution of commands. First of all, the host 20 issues a write command containing a specific data to the non-volatile memory controller 212. If the write command is determined to be a secure-element control command by the non-volatile memory controller 212, the non-volatile memory controller 212 revises the set of parameters of the secure element 211 in response to the write command and according to the specific data. The secure element 211 containing the revised set of parameters issues a signal indicative of revision completion to the non-volatile memory controller 212 (see the dash line). The non-volatile memory controller 212, in response to the signal indicative of revision completion, further performs an operation of writing a result of the revision, e.g., a code indicative of successful revision, into the non-volatile memory device 210. Meanwhile, the non-volatile memory controller 212 sends back to the host 20 a signal indicative of write completion. Similar to the option shown in FIG. 3C, the operation of writing a result of the revision into the non-volatile memory device 210 may be omitted, as illustrated in FIG. 4C. Meanwhile, the signal indicative of revision completion issued from the secure element 211 is transmitted all the way to the host 20 instead of the non-volatile memory controller 212. Therefore, the operational frequency of non-volatile memory device 210 can be reduced so as to extend its life span.

Figure 5A:
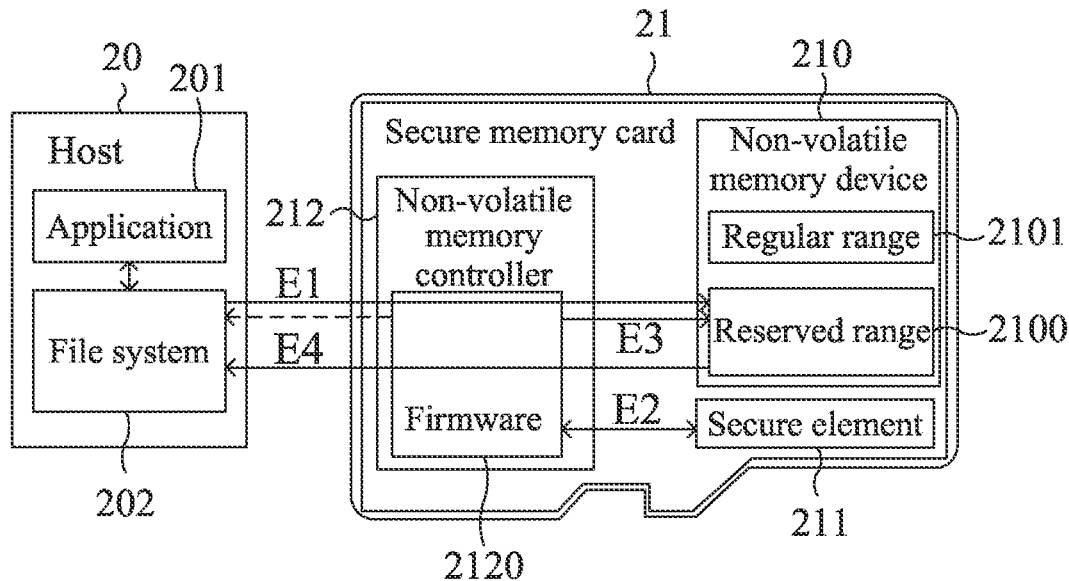
FIG. 5A is a functional block diagram schematically illustrating a secure memory card according to a third embodiment of the present invention.

FIG. 5A schematically illustrates a secure memory card according to a third embodiment of the present invention. In this embodiment, the file system 202 issues a write command E1 corresponding to a specific address, e.g., a fourth address, wherein the write command is a single command taking a single instruction cycle and contains no data to be written, and the fourth address belongs to the reserved range 2100 of the non-volatile memory device 210. The write command E1 is thus determined to be a secure-element control command for triggering the securing operation of the secure element 211. The firmware 2120 included in the non-volatile memory controller 212, when recognizing the secure-element control command, issues a command E2 to read a specific information of the secure element 211, e.g., a firmware version of the secure element 211. For example, the secure element 211 sends the firmware version thereof back to the non-volatile memory controller 212, as indicated by an arrow E2, and then the firmware 2120 writes the firmware version of the secure element 211 into the reserved range 2100, as indicated by an arrow E3. Afterwards, the file system 202 may read back the firmware version of the secure element 211 from the reserved range 2100, as indicated by an arrow E4. According to this embodiment of the present invention, the acquisition of the firmware version of the secure element 211 can be secured by way of this kind of write command.

Figure 5B:
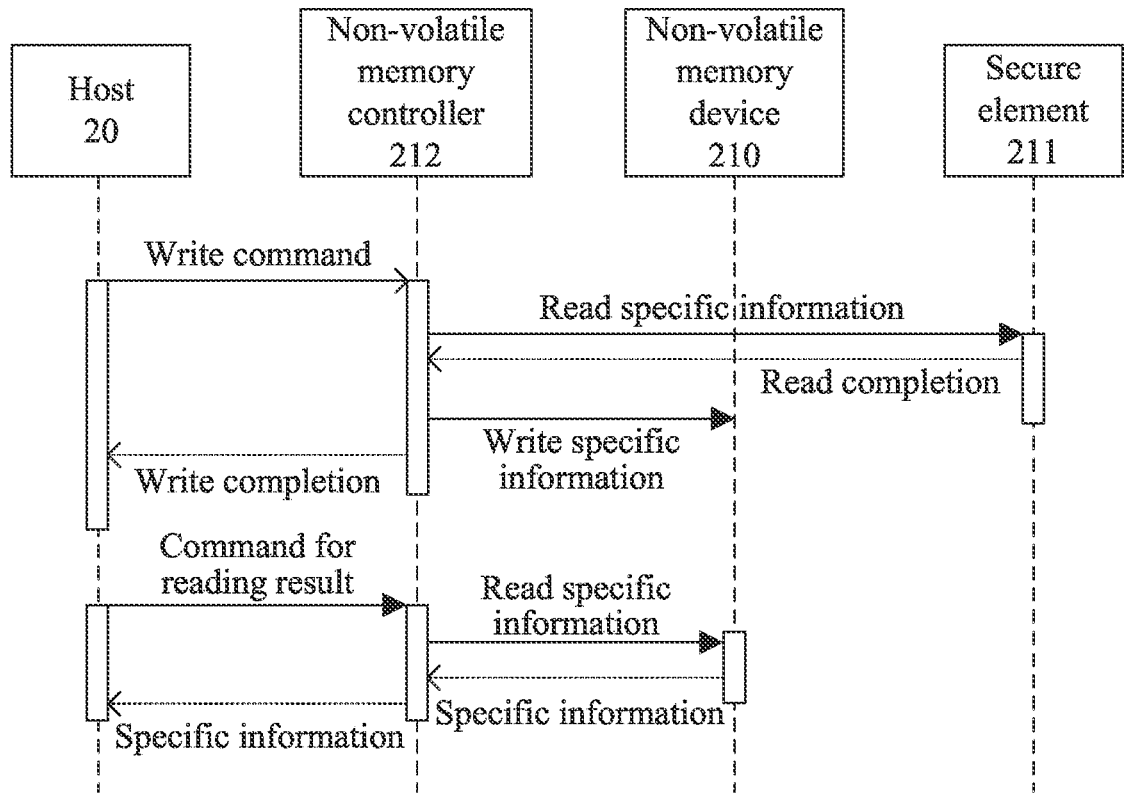
FIG. 5B is a schematic timing diagram of an exemplified securing operation conducted on the secure memory card shown in FIG. 5A.

FIG. 5B schematically illustrates a timing diagram of a secured read operation performed with the secure memory card shown in FIG. 5A. In particular, the timing diagram is used for illustrating details and time sequence of transmission and execution of commands. First of all, the host 20 issues a write command containing a specific data to the non-volatile memory controller 212. If the write command is determined to be a secure-element control command by the non-volatile memory controller 212, the non-volatile memory controller 212 reads a specific information, e.g., firmware version of the secure element 211, in response to the write command. Subsequently, the secure element 211 issues a signal indicative of read completion to the non-volatile memory controller 212 (see the dash line). The non-volatile memory controller 212, in response to the signal indicative of read completion, further performs an operation of writing a result of the read operation, e.g., a code indicative of successful reading, into the non-volatile memory device 210. Meanwhile, the non-volatile memory controller 212 sends back to the host 20 a signal indicative of write completion. The host 20, in response to the signal indicative of write completion, issues a result-reading command to the non-volatile memory controller 212. The non-volatile memory controller 212 then reads the specific information (firmware version) from the non-volatile memory device 210, and transfers the specific information (firmware version) to the host 20.

Figure 5C:
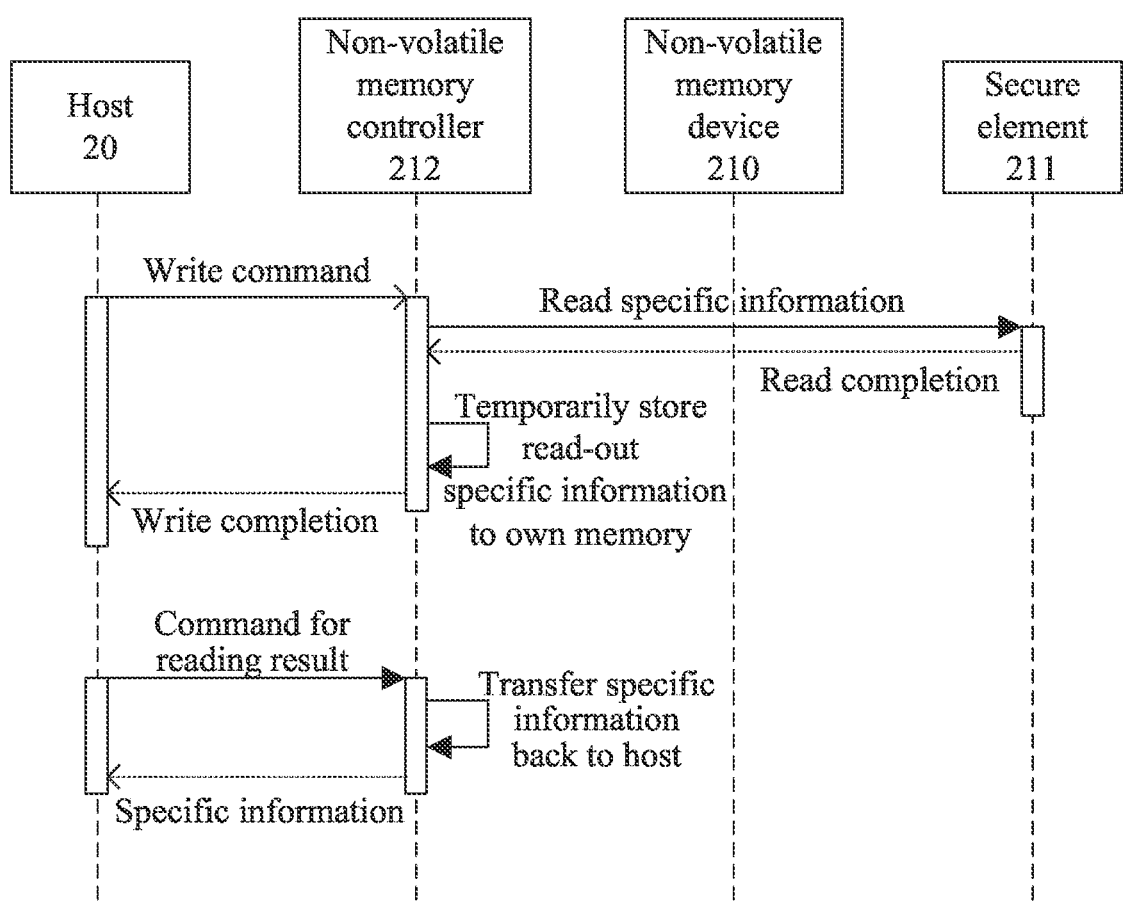
FIG. 5C is a schematic timing diagram of another example of securing operation conducted on the secure memory card shown in FIG. 5A.

Likewise, the operation of writing a result of the read operation into the non-volatile memory device 210 may be omitted, as illustrated in FIG. 5C. Instead, the read-out specific information (firmware version) is temporarily stored in a memory of the non-volatile memory controller 212, and replies to the host 20 a signal indicative of write completion. Then the file system 202 issues a command for reading the result (firmware version), which is a read command with a specific address. The specific address belongs to the reserved range 2100 of the non-volatile memory device 210. The firmware 2120 included in the non-volatile memory controller 212, when recognizing the specific address, transfers the specific information (firmware version) temporarily stored in the memory of the non-volatile memory controller 212 to the host 20, thereby avoiding overuse and extending lifespan of the non-volatile memory device 210.

Figure 6A:
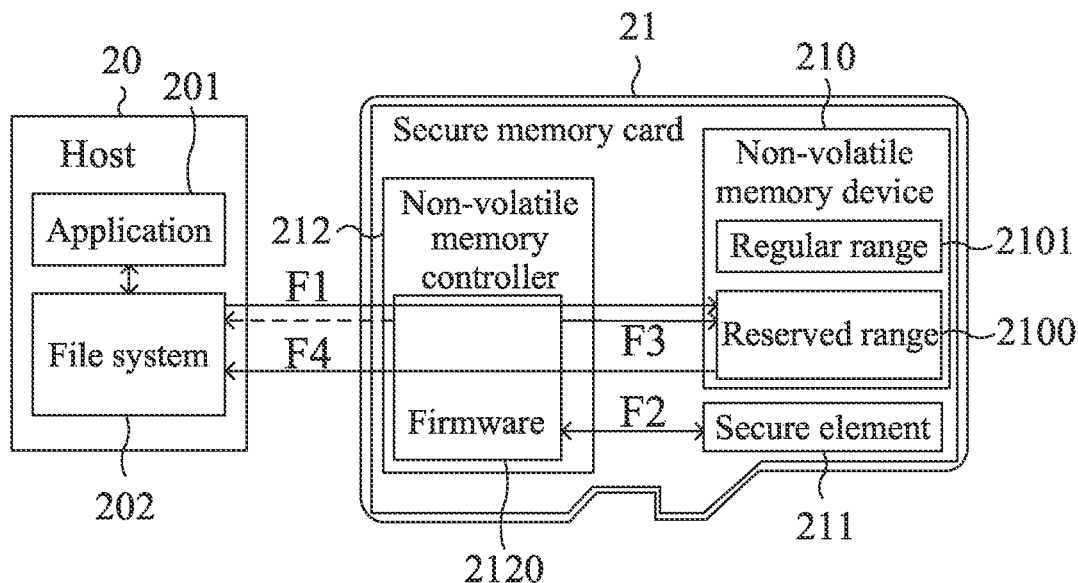
FIG. 6A is a functional block diagram schematically illustrating a secure memory card according to a fourth embodiment of the present invention.

FIG. 6A schematically illustrates a secure memory card according to a fourth embodiment of the present invention. In this embodiment, the file system 202 issues a write command F1 corresponding to a specific address, e.g., a fifth address, to the non-volatile memory controller 212, wherein the write command is a single command taking a single instruction cycle and contains a specific data to be written, and the fifth address belongs to the reserved range 2100 of the non-volatile memory device 210. The write command F1 is thus determined to be a secure-element control command for triggering the securing operation of the secure element 211. The firmware 2120 included in the non-volatile memory controller 212, when recognizing the fifth address, issues a command F2 to drive the secure element 211 to encrypt the specific data. For example, the secure element 211 sends the encrypted data back to the non-volatile memory controller 212, as indicated by an arrow F2, and then the firmware 2120 writes the encrypted data into an address belonging to the reserved range 2100, as indicated by an arrow F3. Afterwards, the file system 202 may read back the encrypted data of the secure element 211 from the reserved range 2100, as indicated by an arrow F4. According to this embodiment of the present invention, a specific data can be encrypted and the encrypted data can be read back by way of this kind of write command.

Figure 6B:
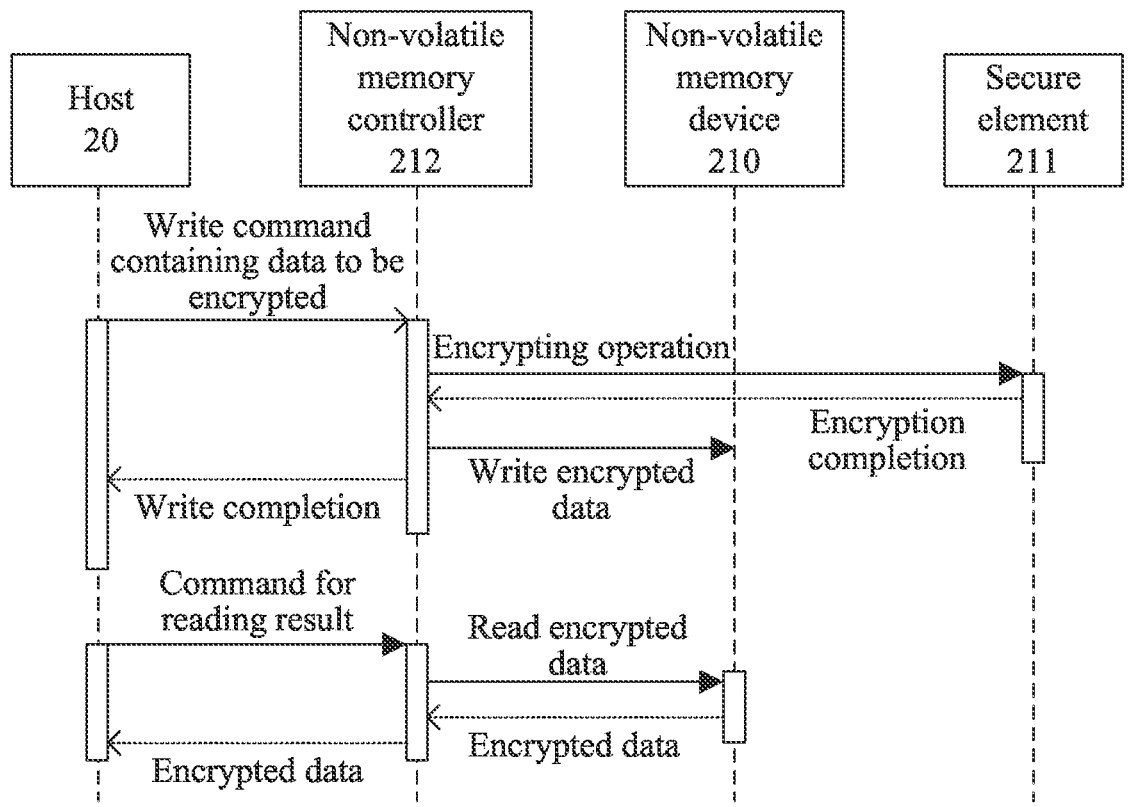
FIG. 6B is a schematic timing diagram of an exemplified securing operation conducted on the secure memory card shown in FIG. 6A.

FIG. 6B schematically illustrates a timing diagram of an encryption operation performed with the secure memory card shown in FIG. 6A. In particular, the timing diagram is used for illustrating details and time sequence of transmission and execution of commands. First of all, the host 20 issues a write command containing a specific data to be encrypted to the non-volatile memory controller 212. Since the write command is secure-element control command, the non-volatile memory controller 212 sends the specific data to the secure element 211 to be encrypted in response to the write command. Subsequently, the secure element 211 issues a signal indicative of encryption completion to the non-volatile memory controller 212 (see the dash line). The non-volatile memory controller 212, in response to the signal indicative of encryption completion, further performs an operation of writing the encrypted data into the non-volatile memory device 210, and sends back to the host 20 a signal indicative of write completion of the encrypted data. The host 20, in response to the signal indicative of write completion, issues a result-reading command to the non-volatile memory controller 212. The non-volatile memory controller 212 then reads the encrypted data from the non-volatile memory device 210, and transfers the encrypted data to the host 20.

Figure 6C:
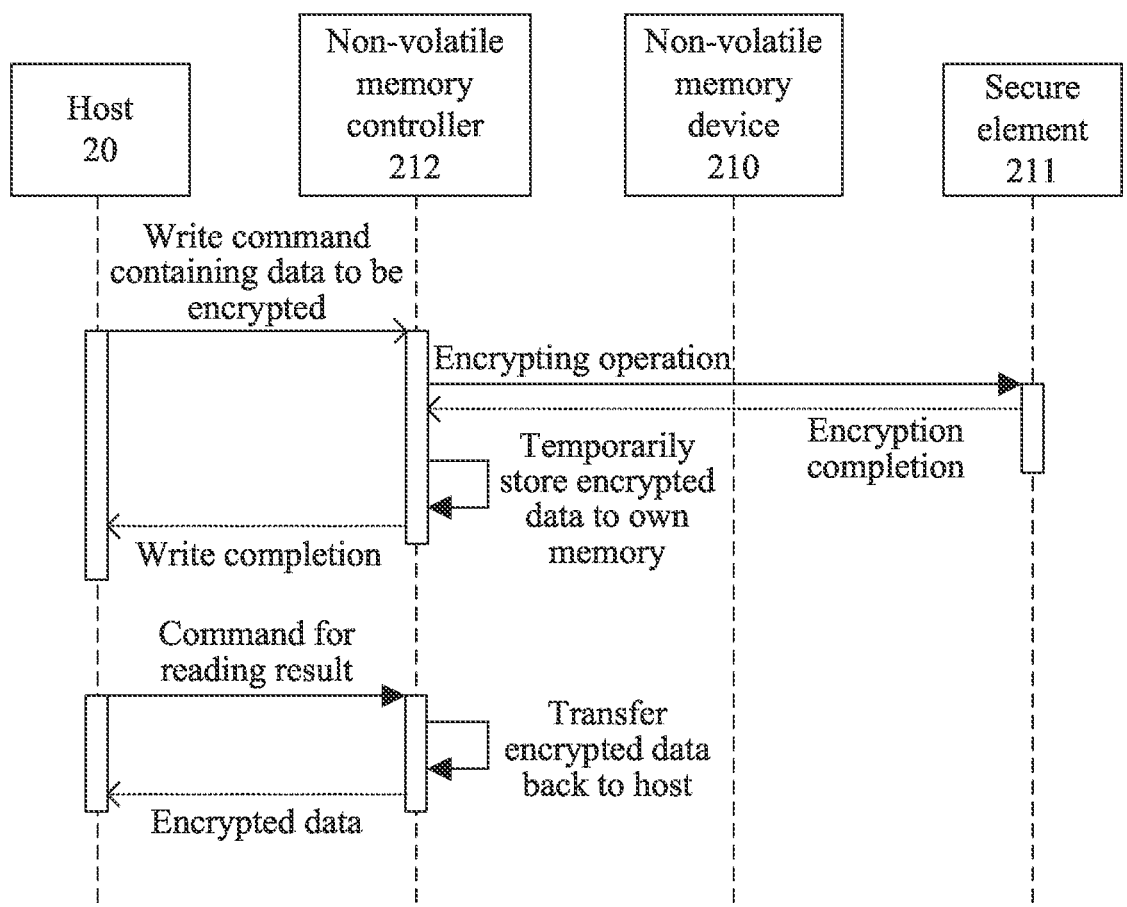
FIG. 6C is a schematic timing diagram of another example of securing operation conducted on the secure memory card shown in FIG. 6A.

Likewise, the operation of writing a result of the read operation into the non-volatile memory device 210 may be omitted, as illustrated in FIG. 6C. Instead, the encrypted data is temporarily stored in a memory of the non-volatile memory controller 212, and replies to the host 20 a signal indicative of write completion. Then the file system 202 issues a command for reading the result (encrypted data), which is a read command with a specific address. The specific address is located in the reserved range 2100 of the non-volatile memory device 210. The firmware 2120 included in the non-volatile memory controller 212, when recognizing the specific address, transfers the encrypted data temporarily stored in the memory of the non-volatile memory controller 212 to the host 20, thereby avoiding overuse and extending lifespan of the non-volatile memory device 210.

Figure 7:
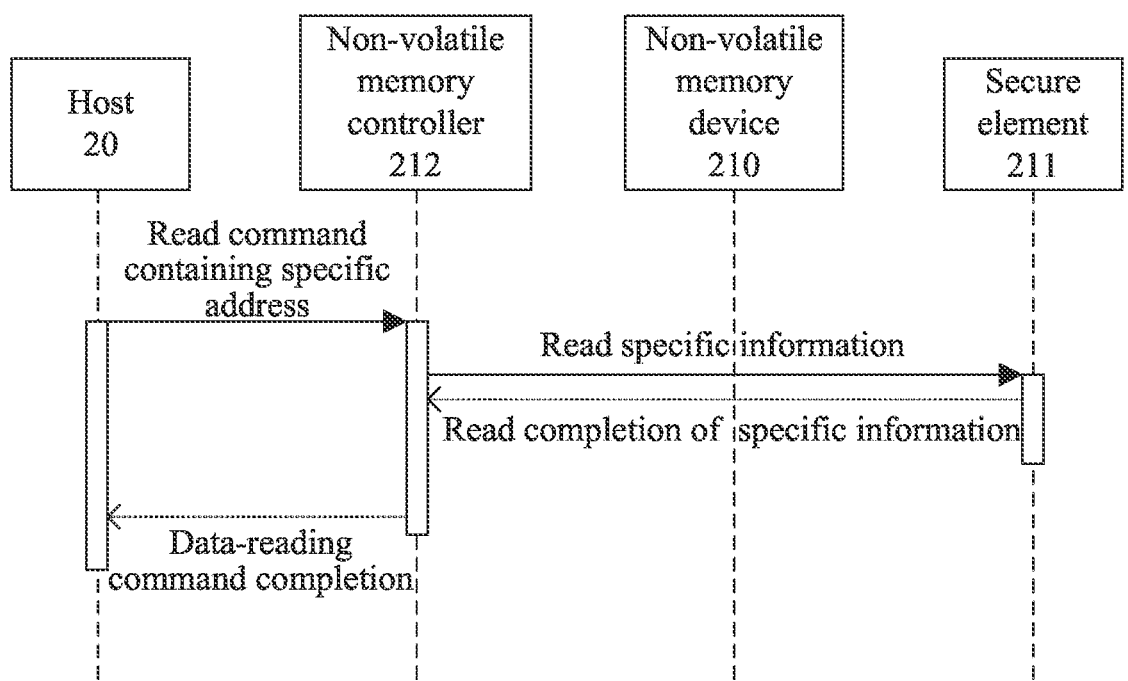
FIG. 7 is a schematic timing diagram of a further example of securing operation conducted on the secure memory card according to an embodiment of the present invention.

In the above embodiments, a write command with or without data to be written is used as a secure-element control command for triggering a securing operation of the secure element 211 when the address in connection with the write command belongs to the reserved range of addresses and the write command is a single command taking a single instruction cycle. Alternatively, a read command, which is a single command taking a single instruction cycle, may also be used as a secure-element control command to trigger the securing operation of the secure element 211. FIG. 7 schematically illustrates a timing diagram of a securing operation of the secure element 211 triggered by a read command according to an embodiment of the present invention. In particular, the timing diagram is used for illustrating details and time sequence of transmission and execution of commands. First of all, the host 20 issues a read command containing a specific address to the non-volatile memory controller 212. In response to the read command, the firmware 2120 included in the non-volatile memory controller 212, when recognizing the specific address, is triggered to read a specific information, e.g., a firmware version, of the secure element 211 at the specific address. Subsequently, the secure element 211 issues a signal indicative of read completion of the specific information (firmware version) to the non-volatile memory controller 212 (see the dash line). The non-volatile memory controller 212, in response to the signal indicative of read completion, further performs an operation of writing the read-out specific information (firmware version) into the non-volatile memory device 210. Meanwhile, the non-volatile memory controller 212 sends back to the host 20 a signal indicative of data-reading command completion. It is understood by those skilled in the art that any other suitable data access command, which is a single command taking a single instruction cycle, can be used herein to trigger the securing operation of the secure element, and is not to be redundantly described herein.

Figure 8:
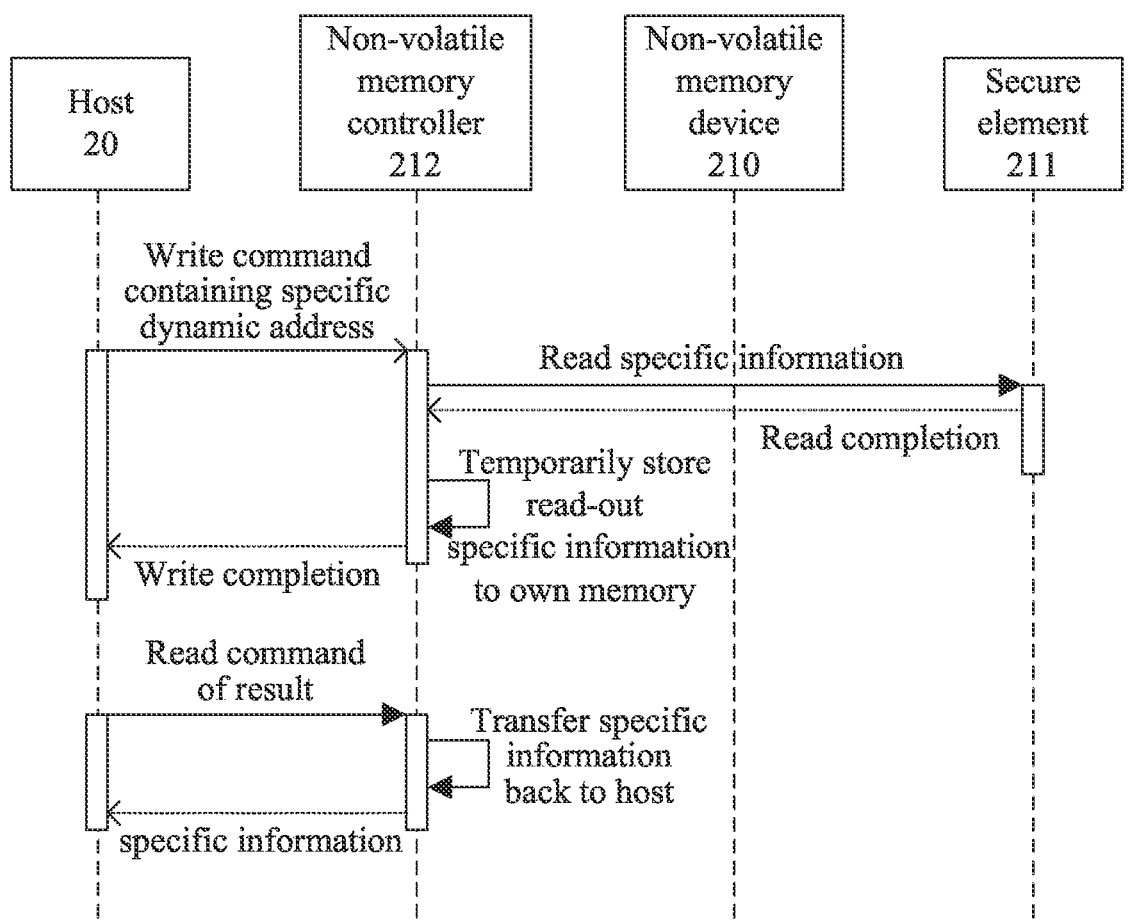
FIG. 8 is a schematic timing diagram of still another example of securing operation conducted on the secure memory card according to an embodiment of the present invention.

FIG. 8 schematically illustrates a timing diagram of a securing operation performed in response to a secure-element control command according to an embodiment of the present invention. The securing operation is an encryption operation similar to that described with reference to FIG.

5C. In particular, the timing diagram is used for illustrating details and time sequence of transmission and execution of commands. First of all, the host 20 issues a write command containing a specific dynamic address to the non-volatile memory controller 212. The specific dynamic address may be dynamically selected from a plurality of multi-bit digits, which comply with a specific formula and are unique enough to be readily recognized by the firmware 2120. Then the non-volatile memory controller 212 reads a specific information, e.g., firmware version of the secure element 211, in response to the write command. Then the non-volatile memory controller 212 is triggered to read a specific information, e.g., firmware version of the secure element 211, in response to the write command. Subsequently, the secure element 211 issues a signal indicative of read completion to the non-volatile memory controller 212 (see the dash line). The read-out specific information (firmware version) is temporarily stored in a memory of the non-volatile memory controller 212, and replies to the host 20 a signal indicative of write completion. Then the file system 202 issues a command for reading the result (firmware version), which is a read command with a specific address. The specific address belongs to the reserved range 2100 of addresses of the non-volatile memory device 210. The firmware 2120 included in the non-volatile memory controller 212, when recognizing the specific address, transfers the specific information (firmware version) temporarily stored in the memory of the non-volatile memory controller 212 to the host 20, thereby avoiding overuse and extending lifespan of the non-volatile memory device 210.

The non-volatile memory controller 212 described in any of the above embodiments may be, for example, a secure digital memory card controller, which is so-called as an SD controller. The firmware 2120 included in the SD controller 212 may communicate with the secure element 211 via a full duplex communication bus such as serial peripheral interface (SPI). Since full duplex indicates bidirectional data flows, i.e., both data transmission and data receiving, the transmission speed is enhanced compared with the conventional ISO-7816 smart card communication protocol.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A secure memory card, comprising:
    a non-volatile memory device for storing data, including a regular range of addresses and a reserved range of addresses;
    a secure element for conducting a securing operation; and
    a non-volatile memory controller in communication with the non-volatile memory device and the secure element, adapted to receive a command from a host,
    wherein the non-volatile memory controller interacts with the secure element to conduct the securing operation in response to the command from the host if the command from the host is secure-element control command, which is a single command taking a single instruction cycle and corresponding to a specific address belonging to the reserved range of addresses, and the non-volatile memory controller interacts with the non-volatile memory device while having no interaction with the secure element in response to the command from the host if the command from the host is a non-secure-element control command corresponding to a regular address belonging to the regular range of addresses, and
    wherein when the secure-element control command is a write command corresponding to a first specific address belonging to the reserved range of addresses, the securing operation is that a firmware of the non-volatile memory controller recognizing the first specific address sets the secure element to be in a first encryption mode, and when the secure-element control command is a write command corresponding to a second specific address belonging to the reserved range of addresses and different from the first specific address, the securing operation is that the firmware of the non-volatile memory controller recognizing the second specific address sets the secure element to be in a second encryption mode different from the first encryption mode.

2. The secure memory card according to claim 1, wherein the regular range of addresses and the reserved range of addresses do not overlap with each other.

3. A secure memory card, comprising:
    a non-volatile memory device for storing data, including a regular range of addresses and a reserved range of addresses;
    a secure element for conducting a securing operation; and
    a non-volatile memory controller in communication with the non-volatile memory device and the secure element, adapted to receive a command from a host,
    wherein the non-volatile memory controller interacts with the secure element to conduct the securing operation in response to the command from the host if the command from the host is secure-element control command, which is a single command taking a single instruction cycle and corresponding to a specific address belonging to the reserved range of addresses, and the non-volatile memory controller interacts with the non-volatile memory device while having no interaction with the secure element in response to the command from the host if the command from the host is a non-secure-element control command corresponding to a regular address belonging to the regular range of addresses, and
    wherein when the secure-element control command is a write command containing a first specific data to be written into a third specific address belonging to the reserved range of addresses, the securing operation is that a firmware of the non-volatile memory controller recognizing the third specific address revises a set of parameters of the secure element according to the first specific data.

4. A secure memory card, comprising:
    a non-volatile memory device for storing data, including a regular range of addresses and a reserved range of addresses;
    a secure element for conducting a securing operation; and
    a non-volatile memory controller in communication with the non-volatile memory device and the secure element, adapted to receive a command from a host,
    wherein the non-volatile memory controller interacts with the secure element to conduct the securing operation in response to the command from the host if the command from the host is secure-element control command, which is a single command taking a single instruction cycle and corresponding to a specific address belonging to the reserved range of addresses, and the non-volatile memory controller interacts with the non-volatile memory device while having no interaction with the secure element in response to the command from the host if the command from the host is a non-secure-element control command corresponding to a regular address belonging to the regular range of addresses, and wherein when the secure-element control command is a write command corresponding to a fourth specific address belonging to the reserved range of addresses, the securing operation is that a firmware of the non-volatile memory controller recognizing the fourth specific address reads a specific information from the secure element.

5. The secure memory card according to claim 4, wherein the specific information is a firmware version of the secure element, and the firmware of the non-volatile memory controller writes the read-out firmware version into an address belonging to the reserved range of addresses or temporarily store the read-out firmware version to be accessed by the host.

6. A secure memory card, comprising:
a non-volatile memory device for storing data, including a regular range of addresses and a reserved range of addresses;
a secure element for conducting a securing operation; and
a non-volatile memory controller in communication with the non-volatile memory device and the secure element, adapted to receive a command from a host,
wherein the non-volatile memory controller interacts with the secure element to conduct the securing operation in response to the command from the host if the command from the host is secure-element control command, which is a single command taking a single instruction cycle and corresponding to a specific address belonging to the reserved range of addresses, and the non-volatile memory controller interacts with the non-volatile memory device while having no interaction with the secure element in response to the command from the host if the command from the host is a non-secure-element control command corresponding to a regular address belonging to the regular range of addresses, and wherein when the secure-element control command is a data access command taking a single instruction cycle and corresponding to a sixth specific address belonging to the reserved range of addresses and dynamically selected from a group consisting of a plurality of multi-bit digits, which comply with a specific formula, the securing operation is that a firmware of the non-volatile memory controller recognizing the sixth specific address performs data access to the sixth specific address.

7. A control method of a secure memory card, the secure memory card being adapted to be used with a host, the host including a file system, the secure memory card including a non-volatile memory device, a secure element and a non-volatile memory controller, and the control method comprising:
in response to the host issuing a secure-element control command, which is a single command taking a single instruction cycle and corresponds to a specific address belonging to a reserved range of addresses of the non-volatile memory device, to the non-volatile memory controller, the non-volatile memory controller interacts with the secure element to conduct a securing operation; and in response to the host issuing a non-secure-element control command, which corresponds to a regular address belonging to a regular range of addresses of the non-volatile memory device different from the reserved range of addresses, to the non-volatile memory controller, the non-volatile memory controller interacts with the non-volatile memory device while having no interaction with the secure element, wherein:

in response to determining the secure-element control command is a write command corresponding to a first specific address, the securing operation is that the firmware of the non-volatile memory controller recognizing the first specific address sets the secure element to be in a first encryption mode, and when the secure-element control command is a write command corresponding to a second specific address different from the first specific address, the securing operation is executed by the firmware of the non-volatile memory controller recognizing the second specific address to set the secure element to be in a second encryption mode different from the first encryption mode;

in response to determining the secure-element control command is a write command containing a first specific data to be written into a third specific address belonging to the reserved range of addresses, the securing operation is that the firmware of the non-volatile memory controller recognizing the third specific address revises a set of parameters of the secure element according to the first specific data;

in response to determining the secure-element control command is a write command corresponding to a fourth specific address belonging to the reserved range of addresses, the securing operation is that a firmware of the non-volatile memory controller recognizing the fourth specific address reads a specific information from the secure element; or in response to determining the secure-element control command is a data access command taking a single instruction cycle and corresponding to a sixth specific address belonging to the reserved range of addresses and dynamically selected from a group consisting of a plurality of multi-bit digits, which comply with a specific formula, the securing operation is that a firmware of the non-volatile memory controller recognizing the sixth specific address performs data access to the sixth specific address.

8. The control method according to claim 7, wherein the regular range of addresses and the reserved range of addresses do not overlap with each other.

* * * * *